Figure 2:
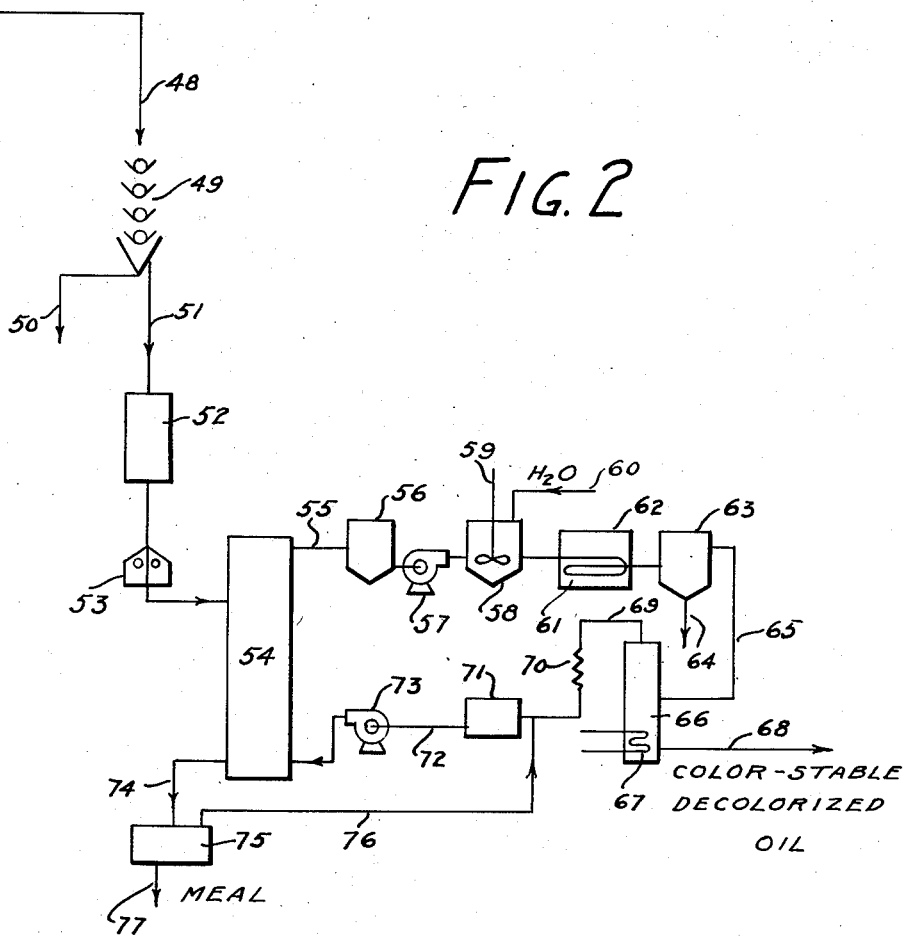

March 26, 1957 L. M. CHRISTENSEN 2,786,859
TREATMENT OF SAFFLOWER OIL
Filed Aug. 5, 1953 2 Sheets-Sheet 1

FIG. 1

INVENTOR.
LEO M. CHRISTENSEN
BY Raymond J. Norton
ATTORNEY

United States Patent Office 2,786,859
Patented Mar. 26, 1957

2,786,859

TREATMENT OF SAFFLOWER OIL

Leo M. Christensen, Omaha, Nebr.

Application August 5, 1953, Serial No. 372,548

8 Claims. (Cl. 260—428.5)

This invention relates to the treatment of safflower oil and more especially to a method of recovering high yields of color-stable oil from safflower seed. This application is a continuation-in-part of prior application Ser. No. 193,254, filed October 31, 1950, now Patent No. 2,667,-499.

Safflower has been known and produced since antiquity; this oil-bearing seed has been found in the graves of the Pharohs in Egypt. The plant is indigenous to the semi-arid sections of India, Egypt, Iran and other areas. From early times safflower has been grown as a source of drugs and dyes from the flower and as a source of edible oil and protein meal from the seed.

Safflower oil is quite fully discussed in the considerable technical literature on the subject and particularly its outstanding value as a non-yellowing drying oil. Paint technologists thus have known of the oil and its desirable characteristics but until very recently it has not entered paint formulations. This was due to the fact that until very recently there was no production of commercial quantities of the oil in this country. It was not until 1949 that the production in this country was large enough to warrant commercial processing of the crop. In this year some forty thousand acres of this plant were cultivated representing the equivalent of about ten million pounds of oil. The quantity of oil thus made available induced the industry to employ it in paint formulations and for other uses such as printer's ink, linoleum, etc.

The oil content of safflower seed displays the expectable variations due to varietal differences, climatic conditions and the conditions of cultivation. As a general rule the variations in the oil content of the seed now grown in this country range from about 26% to 37%; protein content from about 15% to about 22%; moisture from about 6% to about 10% and hulls from about 35% to about 50%. The properties of safflower oil are well known to the art and are fully discussed in the technical literature. One of the outstanding characteristics of this oil is the high content of linoleic acid and the very low content of linolenic acid. Because of this low content of linolenic acid surface coatings formulated with safflower oil do not yellow to any appreciable extent on ageing and thus is an oil of choice in the production of white alkyd coatings.

Safflower oil may be recovered from the seed by the usual methods such as by mechanically expelling the oil or by extracting it with a solvent. When the moisture content temperature during expelling or extraction and other factors are properly controlled, the oil produced is of a bright golden color. The normal color bodies in the oil apparently are largely carotenoids. These are thermolabile and hence the oil can be considerably decolorized by decomposing these carotenoids. This may readily be achieved by holding the oil at a temperature of about 485° F. for a period of about five minutes; this results in improving the color from 8 to 1–2 on the Gardner scale.

As has been explained in the copending application, Ser. No. 193,254, now Patent No. 2,667,499, intensive investigation of this oil resulted in the discovery of a characteristic of the oil which was previously unknown and which has not been reported in the literature. It was found that the oil produced from seed which had been grown under conditions of high moisture access as, for example, seeds produced from irrigated acreage, may contain a compound or complex which profoundly affects the commercial value of the oil. This compound or complex, in effect, is a potential color imparting material. The compound or complex as occurring in the oil is not a color body in the ordinary sense since it does not have any discernable tinctorial value per se, but nevertheless, under certain conditions, particularly under certain thermal conditions, it undergoes a change or reaction resulting in a profound and undesirable modification in the color of the whole body of oil.

This invention is based upon the discovery of such potential color imparting substance or substances and the development of a simple unit process for its removal.

In order to more clearly explain the invention, flow sheets of the process are shown in the accompanying drawings in which:

Fig. 1 is a flow sheet illustrating the process employing prepressing and solvent extraction, and Fig. 2 illustrates the process operating with solvent extraction alone.

The rationale of the operation of the improved process of the invention can be more readily appreciated after consideration of the effect of the potential color imparting bodies on the ultimate color of the oil. As explained in the copending application, it was found that the oil could readily be produced in a full scale commercial operation by expressing the oil in an Anderson expeller and filtering. This pressed, filtered product was a clear, limpid oil of a light amber color. It transpired that a tank car of this oil shipped to a consignee did not have the color of the oil as pressed and filtered but had changed to a distinctly brown color. A check of the processing equipment and shipping conditions established the fact that there could have been no introduction of color bodies from an extraneous source.

Continued investigation of the possible reasons for this undesired change in color resulted in the finding that such color change occurred in the oil produced from seed grown largely on well watered or irrigated acreage.

As further explained in the earlier application, it was ascertained that the undesired color could be developed by application of heat; specifically it was found that if a pressed oil was heated to between about 200° F. and 250° F. and filtered, the oil acquired a deep brown color. When a similar sample of such oil was filtered and agitated with a 0.4% by volume of water and then heated and filtered, the filtered oil was only slightly brown. When such oil was treated by adding 0.6% of water for a period of between 5 and 30 minutes at a temperature of between 75° F. and 200° F. and filtered, the filtered oil was of a clear, limpid, light amber color and that such color was stable thereafter.

The potential color-imparting compounds present in the oil apparently are unsaturated compounds which can be hydrated stoichiometrically to form a compound or compounds insoluble in the oil and can readily be removed by filtration or equivalent liquid-solids separation method.

In the course of further investigation, it was found that oil extracted from the press cake or from flaked seed similarly displayed this tendency toward undesirable color change. As a result of additional research and experimentation, it was found that such color bodies could be removed from solvent-extracted oil by hydration with water and this most effectively if the hydration was carried out at a particular stage in the process, namely, before separation of solvent from the extracted oil.

The present invention, therefore, relates to a process of producing safflower oil of a stable, light color by solvent extraction of the press cake or solvent extraction of the seed.

As shown in Fig. 1 which is a flow sheet of a combined expelling and solvent extraction plant, the seed to be treated is taken from charge lines and passed to a crushing machine such as a roller mill 1. Inasmuch as a large proportion of the seed is comprised of hulls (from about 35% to about 50%), it is desirable to corticate the seed. This may be done in any orthodox or conventional manner as by screening and aspirating, as is indicated generally at 1'. The separated hulls are then removed from the system as shown at 2. As explained in the earlier application, it is advisable, for efficient expelling, to leave in the decorticated seed from about 5% to 10% and preferably about 7% of the hulls. The resulting meal is an excellent stock feed containing of the order of about 40% protein.

The crushed, decorticated seed is then fed to any suitable expeller such as an Anderson expeller 3 in which the oil is expelled from the seed in the desired amount. The expelled oil is passed continuously through the line 4 to a unit in which the foots are separated from the oil. This may comprise the settler 5. The settled foots are continuously removed, as by means of the drag conveyor 6 and are passed to the roller mill 1.

The oil from which the foots have been separated is passed through the line 8 to the filter 9. The filtered solids are removed from the filter as indicated at 9 and the filtered oil is continuously discharged through line 11 for treatment to remove the potential color-forming bodies.

As pointed out, this treatment comprises essentially a hydration of such bodies to insoluble compounds which are then removed from the oil. In the preferred method this hydration is effected with water or steam. The oil to be treated is passed in metered amounts through the line 11 to a vessel 12 in which it is agitated, as by means of the agitator 13, with the stoichiometrical regenerated amount of water or steam admitted through line 14. The oil with the predetermined regulated amount of water is agitated thoroughly and is passed continuously through the coil 15 located in any suitable heater 16 where it is heated to the desired temperature. The length of the coil is such as to establish the desired retention period at the treating temperature. If desired, the oil may be passed to a preliminary heater and raised to the desired temperature and thence to a coil of sufficient length to insure the desired holding time at such temperature.

This hydration treatment, as explained, insolubilizes the potential color-imparting bodies. The heated oil is passed to a suitable separation such as the filter 17 and the insoluble product is discharged at 18. The color-stable, decolorized oil is continuously removed through line 19 and passed to storage 20.

The hydration may be effected by heating in a temperature range of from about 75° F. to 200° F. for from 10 to 30 minutes with the practical optimum of a temperature of 160°–170° F. for a period of approximately 20 minutes.

The press cake from the expeller may be subjected to solvent extraction to recover the residual oil. This extracted oil is effectively deprived of its potential color-forming bodies in the novel manner shown in the drawings. The press cake is discharged from the expeller through conduit 21 and is passed to any suitable conditioner 22 in which the prepress cake is heated and dried or humidified to adjust the temperature and moisture content to that degree which insures optimum subsequent extraction. The conditioned press cake is withdrawn from the conditioner and passed to a unit 23 such as a two high roller flaker or equivalent machine, in which the cake is reduced to flakes or equivalent units of such particle size as to insure most efficient extraction of the oil when the cake is subsequently contacted with solvent. It has been found that good extraction can be secured by adjusting the thickness of the flakes to about 0.006 in.–0.009 in. The flake charge is fed to any suitable extraction unit 24 in which it is continuously extracted with a suitable solvent entering the lower section of the extraction through line 42. The extractor may be of any suitable type such as the counter-current system shown or the well known basket type. The solvent may be chosen from any of the well known, effective solvents for fatty oils such as the common coal paraffins, trichlorethylene, etc. In the preferred operation, hexane is used.

It has been found that very effective extraction is achieved by extraction at a temperature of from about 120° F. to 135° F. utilizing a solvent ratio of about one pound of solvent to one pound of oil producing a final micella concentration of about 25%.

As shown, in the illustrative embodiment, the recycled solvent passes upwardly through the extraction column 24 in counter-current contact to the flakes and the micella is continuously withdrawn from the upper section of the column and is passed through line 25 to the filter 26. In the filter the meal fines are removed and may be treated in any conventional or orthodox manner. The micella is withdrawn through pump 27 and is passed directly to the vessel 28. In this vessel, as previously explained, water (or steam) is admitted in regulated amounts through line 30 so as to insure a substantially stoichiometric amount (approximately 0.6%) of such hydrating agent based on the oil content of the micella. The micella-water mixture is thoroughly mixed and agitated by a suitable agitating mechanism such as the paddle mixer 29. This mixture is then passed continuously through the coil 31, located in any suitable heater 32, in which it is raised to a temperature of between about 160° F.–170° F. and retained at such temperature for a period of 20 minutes, the temperature in the heating unit and dimensions of the heating coil being controlled to secure such oil temperature and retention period.

The treated micella, now containing the potential color-imparting bodies in precipitated or insolubilized form, is continuously passed to filter 33 and the insoluble material is removed and withdrawn as shown at 34.

The clarified micella is continuously passed through line 35 to an evaporator system designated generally at 36 in which the micella is heated to a suitable temperature by heating means 37 to evolve the solvent which is passed through line 39 and condenser 40 and recover the oil which may be suitably treated and passed through line 38 to storage 20.

The micella evaporation and treatment of the oil may be carried out in accordance with conventional practice; while for purposes of simplifying the description, the evaporation system 36 is shown as a single unit, it will be understood that in commercial practice this may comprise any of the well known two- or three-stage evaporation systems and preferably a two-stage system in which the preponderant amount of the solvent is removed in the first stage, as for example, in a long tube evaporator associated with a suitable entrainment separator and condenser and a second stage where the oil, containing about 5%, more or less, of solvent is flashed into a vacuum stripping column. The last traces of solvent may be removed with sparging steam.

The condensed, recovered solvent is passed to storage 41 from which it may be continuously withdrawn through line 42 and pump 43 for recycling and reuse in the process. Make-up solvent may be fed into the circuit at any convenient point.

The extracted flakes, gravitating or carried to the lower section of the extractor are withdrawn through conduit 44 and passed to a suitable apparatus 45 in which they are desolventized and deodorized in any suitable manner as by the use of steam jacketed screw conveyors, sparging steam and the like. The solvent separated in such desolventization, may if desired, be recovered and returned to the cycle at any convenient point, as for example, through line 46.

As intimated previously, the safflower seeds may be processed directly by solvent extraction and without prepressing. Such a method of extraction, indicated in the flow sheet of Fig. 2, is the same as that previously described except for the prepressing operation and the refining treatment of the prepressed oil.

In the operation depicted in Fig. 2, the seed is withdrawn from the dry bin, passed to a surge bin and thence to seed scale, as in conventional solvent extraction procedures. The weighed seed is passed through conduit 48 to the cracking rolls 49. The cracked seed may be decorticated to any desired degree and the hulls removed through conduit 50. The cracked seed is continuously transported by conveyor 51 to the meats conditioner 52 where, as previously described, they are conditioned so as to secure optimum temperature and moisture conditions. When desired, prepressed cake in any selected quantity may be fed with whole seed to the cracking rolls 49.

The conditioned meats are then treated in the manner described, i. e., they are continuously flaked, preferably to a thickness of 0.006 in.–0.009 in. in the kaker 53 and are conveyed to extractor in which they are contacted counter-currently (as shown) or concurrently (not shown) with a selected solvent such as hexane, under the temperature and solvent to oil ratio previously mentioned. The micella is passed continuously through line 55 to filter 56 to remove fines and the clarified micella is forced by pump 57 in material amounts to the mixer 58 in which the oil is blended or mixed with water or steam fed in the described stoichiometrical amounts through line 60.

The oil and its contained highly dispersed water is continuously passed through coil 61 and heated by a suitable heater 62 to the described optimum temperature of between about 160° F. and 170° F. and retained at such temperature for a period of 20 minutes to insure hydration of the naturally occurring color-imparting compounds to an insoluble form. The hydrated oil, with or without prior cooling, is then passed continuously through filter 63 where the insoluble are filtered out and removed at 64.

The filtrate, in the manner previously described, is passed to the solvent separation and recovery system 66—67—69 and 70 and the color-stable oil is discharged through line 68.

The recovered solvent is recycled to the extractor through the circuit 71—72—73. The meats are withdrawn from the extractor through conduit 74 and processed in desolventizing system 75, in the manner described, to recover a desolventized meal which is removed through line 77.

It will be understood that while, for purposes of clarifying the description of the invention as depicted in Fig. 1, the pressed oil and extracted oil have been described as separately hydrated, it is obvious that these two oil fractions may be mixed and hydrated at the same time thus eliminating the duplication of hydrating equipment as shown in Fig. 1. Thus, if desired, the units 12 to 19 inclusive of Fig. 1 may be dispensed with and the prepressed filter oil passed directly to mixer 28 by way of the intake side of pump 27 so that the blend of pressed and extracted oils are hydrated. In this type of circuit provisions may be made to cut out the solvent recovery system, as by a suitable cut-off valve in line 35, such that the oil expelled in expeller 3 can be hydrated and clarified in elements 28 to 35 of Fig. 1. These and other circuit modifications may be utilized without departing from the spirit of the invention.

It is to be appreciated that the described process differs in fundamental respects from prior processes where the water-insoluble bodies contained in expressed or extracted oil are removed by precipitation with water. In the present process, compounds which are normally soluble in the oil are converted to oil-insoluble bodies by hydration of the oil in the micella and are removed prior to the separation of micella into oil and solvent fractions.

While preferred modifications of the invention have been described, it will be understood that these are given didactically to elucidate the underlying principles of the invention and not as limiting the useful scope of the invention to the particular illustrative embodiment.

I claim:

1. The method of producing a color-stable safflower oil which comprises hydrating a safflower oil micella at a temperature of between about 75° F. and 200° F. for a period of between about five and thirty minutes, filtering out the insoluble bodies formed and then separating the oil from the solvent.

2. The method of producing color-stable safflower oil which comprises forming a micella of the oil, adding approximately 0.6% of water based on the oil concentration of the micella, maintaining the micella at a temperature of between 75° F. and 200° F. for a period of from about five to thirty minutes, filtering off the solid hydrated bodies and removing the solvent from the oil.

3. A process, in accordance with claim 2, in which the water is thoroughly dispersed in the micella prior to heating.

4. A method, in accordance with claim 2, in which the water-containing micella is heated for approximately 20 minutes at a temperature of between 160° F. and 170° F.

5. A method of processing safflower seed which comprises cracking, flaking the seed, extracting the seed with a suitable solvent to produce a micella of approximately 25% concentration, mixing with the micella an amount of water equivalent to approximately 0.6% of the oil content of the micella, heating the water-containing micella at a temperature of between about 75° F. and 200° F. for a period of between about five and twenty minutes, filtering out insoluble hydrated bodies and separating the solvent from the oil.

6. A method in accordance with claim 5 in which prepressed cake is added to the seed prior to flaking.

7. A method in accordance with claim 5 in which the water-containing micella is held at a temperature of between about 160° F. and 170 F. for a period of approximately twenty minutes.

8. The method of producing color-stable safflower oil which comprises forming a micella of expressed and extracted safflower oil, hydrating the oil content of the micella at a temperature of between about 75° F. and 200° F. for a period of between about five and thirty minutes, filter the micella to remove the insoluble bodies formed and separating the oil from the solvent.

References Cited in the file of this patent

UNITED STATES PATENTS

| | | |
|---|---|---|
| 1,737,402 | Ayres et al. | Nov. 26, 1929 |
| 2,551,254 | Dunning | May 1, 1951 |
| 2,667,499 | Christensen | Jan. 26, 1954 |